(12) United States Patent
Hsieh et al.

(10) Patent No.: US 9,509,419 B2
(45) Date of Patent: Nov. 29, 2016

(54) COMMUNICATION CIRCUIT AND ASSOCIATED CALIBRATION METHOD

(71) Applicant: MStar Semiconductor, Inc., Hsinchu Hsien (TW)

(72) Inventors: Ming-Yu Hsieh, Hsinchu Hsien (TW); Po-Yang Chang, Hsinchu Hsien (TW); Tzu-Chin Lin, Hsinchu Hsien (TW); Yi Lu, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 229 days.

(21) Appl. No.: 14/296,921

(22) Filed: Jun. 5, 2014

(65) Prior Publication Data

US 2014/0364067 A1    Dec. 11, 2014

(30) Foreign Application Priority Data

Jun. 5, 2013    (TW) .............................. 102119956 A (51) Int. Cl.
   *H04B 1/38*    (2015.01)
   *H04B 17/00*   (2015.01)
   *H04B 17/21*   (2015.01)

(52) U.S. Cl.
   CPC .............. *H04B 17/00* (2013.01); *H04B 17/21* (2015.01)

(58) Field of Classification Search
   CPC ........ H04B 17/21; H04B 1/30; H04B 17/14; H04B 17/00; H04B 17/24; H04B 1/40; H04B 17/11; H04B 17/19; H04B 17/20; H04B 17/354; H04B 1/0458; H04B 1/0475; H04B 1/38; H04B 1/52; H03D 3/009; H04L 1/243; H04L 27/36; H04L 27/362; H04L 27/364; H04L 27/3863
   See application file for complete search history.

(56) References Cited

U.S. PATENT DOCUMENTS

| 2008/0139141 | A1  | 6/2008 | Varghese et al. |
|---|---|---|---|
| 2010/0151806 | A1* | 6/2010 | Firoiu ...................... H04B 1/30 455/192.2 |
| 2011/0045788 | A1* | 2/2011 | Kundur Subramaniyan ... H04B 17/0012 455/115.1 |
| 2014/0256376 | A1* | 9/2014 | Weissman .............. H04B 17/19 455/550.1 |

OTHER PUBLICATIONS

Taiwan Office Action, Mar. 25, 2015, 7 pages.

\* cited by examiner

*Primary Examiner* — Golam Sorowar
(74) *Attorney, Agent, or Firm* — Edell, Shapiro & Finnan, LLC (57) ABSTRACT

A communication circuit includes a receiver path, a frequency translating loop filter and a signal source circuit. The frequency translating loop filter includes an auxiliary mixer, and a frequency translating filter backend circuit such as a filter. The signal source circuit can be shared with a transmitter path. When the receiver path receives an external signal, the auxiliary mixer and the frequency translating filter backend circuit perform high-frequency filtering. When the receiver path need not receive the external signal, the auxiliary mixer up-converts a low-frequency auxiliary signal provided by the signal source circuit to a high-frequency domain, and the up-converted signal is received by the receiver path. Thus, an operation parameter of the receiver path can be adjusted and calibrated according to a response of the receiver path.

18 Claims, 9 Drawing Sheets

COMMUNICATION CIRCUIT AND ASSOCIATED CALIBRATION METHOD

This application claims the benefit of Taiwan application Serial No. 102119956, filed Jun. 5, 2013, the subject matter of which is incorporated herein by reference.

BACKGROUND OF THE INVENTION

Field of the Invention

The invention relates in general to a communication circuit and an associated calibration method, and more particularly to a communication circuit that performs a built-in calibration by an up-conversion filter in a frequency translating loop filter, and an associated calibration method.

Description of the Related Art

Various kinds of wired/wireless network systems, e.g., 2G, 3G and subsequently evolved mobile communication systems, local area network (LAN) systems, sensor networks, analog/digital audio/video broadcasting systems, and positioning systems, have become integral parts of the modern information society. In a network system, both a transmitter end and a receiver end include respective communication circuits as a network interface. A communication circuit at the transmitter end is provided with a transmitter path, which may include a digital transmission block, a digital-to-analog converter (DAC), a transmission filter, an up-conversion mixer, and a power amplifier. A communication circuit at the receiver end is provided with a receiver path, which may include an amplifier (e.g., a low-noise amplifier (LNA)), a down-conversion mixer, a reception filter, an analog-to-digital converter (ADC) and a digital reception block. To support information exchange between terminals of the network system, the communication circuits at the terminals may include transmitter paths and receiver paths for transceiving signals.

When a transmitter end is to send information (e.g., digital data, packets, commands and messages) to a receiver end, the information is encoded by the digital transmission block in the transmitter path to form a low-frequency (e.g., baseband/intermediate-frequency (IF)) digital waveform, converted to a low-frequency analog signal by the DAC, passed through the transmission filter, and modulated to a high-frequency (e.g., radio-frequency (RF)) analog signal by the up-conversion mixer. Such high-frequency analog signal is processed by the power amplifier to increase its power and then transmitted to a network medium, e.g., transmitted into space by an antenna. After being received at the receiver end, the high-frequency analog signal is amplified by the amplifier in the receiver path, demodulated into a low-frequency analog signal by the down-conversion mixer, passed through the reception filter, converted to a low-frequency digital signal by the ADC, and processed by the digital reception block to restore the original information.

In the communication circuit, as the receiver path is required to restore the original information from a weak high-frequency signal received from a remote external end, operation parameters of the receiver path need to be extremely carefully adjusted and calibrated. For example, the down-conversion mixer in the receiver path includes an in-phase mixer and a quadrature-phase mixer, whose operations are respectively controlled by corresponding bias voltages. These two bias voltages need to be calibrated to overcome non-linearity caused by mismatch between the in-phase mixer and the quadrature-phase mixer. Further, the LNA in the receiver path may include a load, e.g., an inductor and/or a capacitor. A resonance frequency of the load affects a frequency response of the LNA, and thus also needs to be calibrated to ensure that the resonance frequency of the LNA satisfies an expected standard. Further, a passband frequency of the reception filter, e.g., a frequency range of a 3 dB bandwidth, also requires calibration.

In the prior art, operation parameters of a communication circuit integrated into a chip are calibrated by an external test machine during a factory test procedure. When calibrating the receiver path, the test machine feeds a test tone to the receiver path to simulate an external signal that the receiver end receives, and determines whether the operation parameters of the receiver path are appropriate according to responses of the receiver path with respect to test tone to accordingly calibrate the receiver path.

The prior art is not only costly but also time-consuming. Further, the above conventional solution can only be implemented during the factory test procedure. Once a chip is installed and operated, no calibration can be performed in response to performance drifts caused by temperature or supply voltage variations.

SUMMARY OF THE INVENTION

It is an object of the present invention to provide a communication circuit, e.g., a wireless radio-frequency (RF) network interface circuit, which includes a receiver path, a signal source circuit, an auxiliary mixer and a calibration circuit. The receiver path may include an input port, an amplifier (e.g., a low-noise amplifier (LNA)), a reception mixer (e.g., a down-conversion mixer) and a reception filter. The reception filter is coupled between the reception mixer and the calibration circuit. The reception mixer, coupled to the input port, mixes a signal of the input port with a reception oscillation frequency. The auxiliary mixer, coupled between the input port and the signal source circuit, is operable in an auxiliary mode. The calibration circuit is coupled to the receiver path. For example, the auxiliary mode is a calibration mode.

When the auxiliary mixer operates in the auxiliary mode, the signal source circuit provides an auxiliary signal, e.g., a low-frequency test signal or test tone. The auxiliary mixer mixes the auxiliary signal with the reception oscillation frequency to generate a high-frequency reference signal, and transmits the high-frequency reference signal to the input port. As such, the calibration circuit is able to adjust an operation parameter of the receiver path according to an associated signal (i.e., a response of the receiving path with respect to the reference signal) in the receiver path.

The auxiliary mixer may be a part of a frequency translating loop filter. The frequency translating loop filter may be integrated with the receiver path into the same chip to replace an external surface acoustic wave (SAW) filter.

Preferably, the auxiliary mixer is operable in the auxiliary mode for calibration when the receiver path is not required to receive an external signal. For example, the auxiliary mixer may enter the auxiliary mode when the receiver path is powered up. Preferably, the auxiliary mixer enters the auxiliary mode in an idle period between a burst period and a pre-burst period of the receiver path. As such, the present invention is capable of dynamically and appropriately calibrating the receiver path online in real-time.

Preferably, compared to the auxiliary mode, the auxiliary mixer is operable in a reception mode when the receiver path normally receives an external signal. When the auxiliary mixer operates in the reception mode, the auxiliary mixer may filter a signal of the input port, e.g., performing frequency translating loop filtering, and mix a first passband, e.g., a low-pass passband, with the reception oscillation frequency to provide a second passband, e.g., a passband in a high-frequency domain.

The communication circuit further includes a frequency translating filter backend circuit and a switch circuit. The switch circuit is coupled between the frequency translating filter backend circuit, the signal source circuit and the auxiliary mixer. When the auxiliary mixer operates in the auxiliary mode for calibration, the switch circuit conducts the signal source circuit to the auxiliary circuit, such that the auxiliary mixer may up-convert the auxiliary signal provided by the signal source circuit to the reference signal. When the auxiliary mixer operates in the reception mode, the switch circuit conducts the frequency translating filter backend circuit to the auxiliary mixer, such that the frequency translating filter backend circuit may combine with the auxiliary mixer to form the frequency translating loop filter. For example, the frequency translating filter backend circuit is a filter, e.g., an analog low-pass filter, which provides the foregoing first passband.

Preferably, the communication circuit further includes a transmitter path. The transmitter path includes an output port, a power amplifier, and a transmission mixer, e.g., an up-conversion mixer. The signal source circuit may be a part of the transmitter path, e.g., a digital transmission block in the transmitter path, or a part integrated into a digital transmission block. When the transmitter path transmits a signal to the network medium, the auxiliary mixer is further operable in a transmission mode. In the transmission mode, the signal source circuit may provide a low-frequency signal to be transmitted according to information to be sent. The transmission mixer mixes the signal to be transmitted with a transmission oscillation frequency, and transmits the mixed result to the network medium via the power amplifier and the output port. At this point, the auxiliary mixer may stop mixing the signal provided by the signal source circuit.

Preferably, the communication circuit further includes a digital-to-analog converter (DAC) and a conversion filter. The DAC is coupled to the signal source circuit. The conversion filter is coupled between the DAC and the auxiliary mixer. When the auxiliary mixer operates in the auxiliary mode, the DAC converts the digital auxiliary signal to an analog auxiliary signal and transmits the analog auxiliary signal to the conversion filter. The conversion filter is capable of suppressing conversion noises of the DAC. The DAC and the conversion filter may be a DAC and a transmission filter in the transmitter path.

Preferably, the calibration circuit includes a calibration auxiliary filter coupled to the reception filter of the receiver path. In the auxiliary mode for calibration, when the calibration circuit monitors the response of the receiver circuit with respect to the auxiliary signal to calibrate the operation parameter, the calibration circuit may adjust the passbands of the reception filter and the calibration auxiliary filter, such that an intersection of the passbands of the two covers a response frequency range to be monitored while eliminating other frequency ranges that need not be monitored. Thus, without performing a frequency detection for selecting the response to be monitored on the response signal, the calibration circuit adjusts the operation parameter of the receiver path according to a size of a signal (i.e., the response preserved by the intersection of the passbands) filtered and obtained by the calibration auxiliary filter. The calibration circuit may change the operation parameter under calibration to different values, so that the receiver path may provide a plurality of response signals in response to the signal of the input port according to the different values of the operation parameter. The calibration circuit may compare the sizes of these response signals to accordingly provide an optimized value for the operation parameter under calibration.

Preferably, the operation parameter under calibration may be a bias voltage of the reception mixer. When performing calibration, the signal source circuit provides the auxiliary signal according to the operation frequency band of the receiver path to associate to the auxiliary signal with a fundamental frequency; the calibration circuit renders the intersection of the passbands of the reception filter and the calibration auxiliary filter to cover harmonics of the fundamental frequency, e.g., second harmonics or third harmonics. According to a size of the harmonics, the calibration circuit may optimize a setting of the bias voltage. The operation parameter that the calibration circuit calibrates may be the passband frequency of the reception filter, or a load of the LNA with a resonance frequency that affects the frequency response of the LNA.

The auxiliary mode may be a compensation mode. The auxiliary mixer is operable in the auxiliary mode for compensation when the receiver path receives an external signal. The frequency of the auxiliary signal may be set according to a frequency of interference. After the auxiliary mixer up-converts the auxiliary signal, the interference can be suppressed in the high-frequency domain.

The present invention further discloses a calibration method applied to a communication circuit. The calibration method includes: providing an auxiliary signal by a signal source circuit, and mixing the auxiliary signal with a reception oscillation frequency by an auxiliary mixer to accordingly provide a reference signal; and receiving the reference signal by a receiver path, and adjusting an operation parameter of the receiver path according to a response of the receiver path with respect to the reference signal.

The step of calibrating a predetermined operation parameter may include: changing the predetermined operation parameter to different values; providing a plurality of response signals by the receiver path in response to the reference signal according to the different values of the predetermined operation parameter; and comparing sizes of the response signals to optimize the predetermined operation parameter.

Preferably, the operation parameter under calibration may be a bias voltage of a reception mixer. Preferably, the auxiliary signal is associated with a fundamental frequency, and a passband is provided to render the passband cover a harmonic of the fundamental frequency. When calibrating the operation parameter, the operation parameter is adjusted according to a size of a filtered result of the passband. The operation parameter that can be calibrated further includes a passband frequency of the receiver filter and a load of an amplifier of the receiver path.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
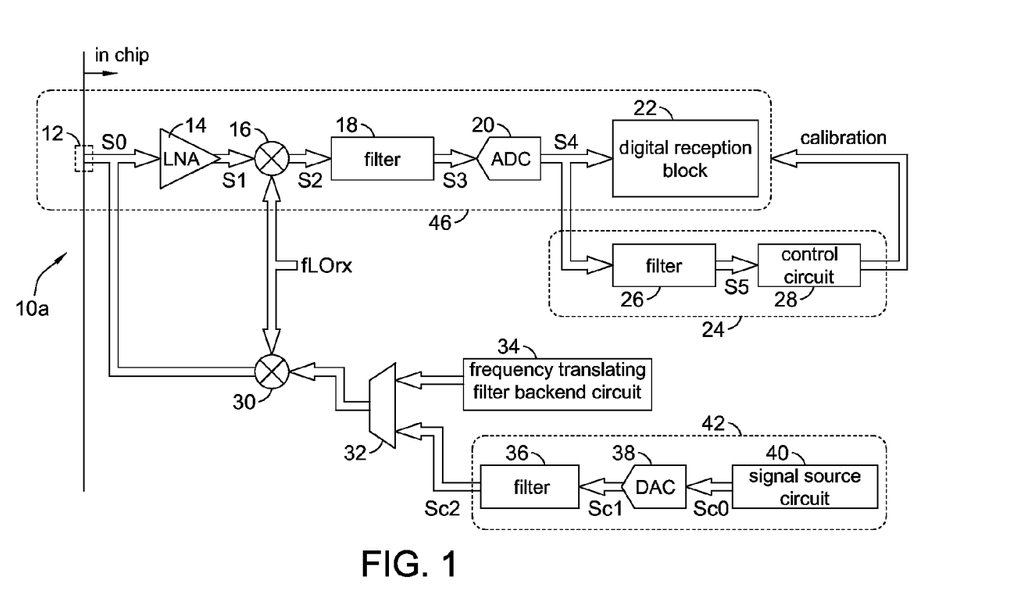
FIG. 1 to FIG. 5 are schematic diagrams of a communication circuit according to embodiments of the present invention.

FIG. 1 shows a schematic view of a communication circuit 10a according to an embodiment of the present invention. For example, the communication circuit 10a is a wireless RF network interface circuit, and may be integrated in a chip. The communication circuit 10a includes a receiver path 46, a calibration circuit 24, a mixer 30, a switch circuit 32, a frequency translating filter backend circuit 34, and a signal source module 42. The receiver path 46 includes an input port 12, an amplifier 14, a mixer 16, a filter 18, a converter 20, and a digital reception block 22. The signal source module 42 includes a filter 36, a converter 38, and a signal source circuit 40.

In the receiver path 46, the amplifier 14, e.g., a low-noise amplifier (LNA), coupled between the input port 12 and the mixer 16, amplifies a signal S0 of the input signal 12 to a signal S1. The mixer 16 may serve as a down-conversion reception mixer, and mixes the signal S1 with a frequency fLOrx. The frequency fLOrx is a reception oscillation frequency for demodulation. The filter 18, coupled between the mixer 16 and the converter 20, e.g., an analog low-pass or band-pass filter, filters a signal S2 to a signal S3. The converter 20 is an analog-to-digital converter (ADC), which is coupled to the digital reception block 22, converts the analog signal S2 to a digital signal S4 that is received and processed by the digital reception block 22.

The other mixer 30 in the communication circuit 10a may serve as an up-conversion auxiliary mixer coupled between the input port 12 and the switch circuit 32. The switch circuit 32 is coupled between the frequency translating filter backend circuit 34, the signal source module 42 and the mixer 30. For example, the frequency translating filter backend circuit 34 may be a filter.

The communication circuit 10 is operable in a reception mode and an auxiliary mode. For example, the auxiliary mode may include a calibration mode. When the communication circuit 10a operates in the reception mode, the signal S0 is an external signal from a remote end, and may be amplified by the amplifier 14 in the receiver path 46, mixed with the frequency fLOrx and down-converted by the mixer 16, filtered by the filter 18, converted to a digital domain by the converter 20, and received and decoded by the digital reception block 22 to restore information transmitted from the remote end. In the reception mode, the switch circuit 32 may separate the mixer 30 from the signal source module 42, and conduct the frequency translating filter backend circuit 34 to the mixer 30. As such, the mixer 30 and the frequency translating filter backend circuit 34 are rendered to operate in collaboration, so as to provide the signal S0 of the input port 12 with a function of a frequency translating loop filter to filter the signal S0 and to suppress noises and interferences in the signal S0. For example, in the reception mode, the frequency translating filter backend circuit 34 and the mixer 30 collaboratively provide a passband (e.g., a low-pass passband) in a low-frequency domain (e.g., baseband or IF). The mixer 30 then mixes the passband in the low-frequency domain with the frequency fLOrx to convert the passband in the low-frequency domain to a passband in a high-frequency domain (e.g., RF) to further perform bandpass filtering on the signal S0 in the high-frequency domain.

When the receiver path 46 need not receive an external signal, the communication circuit 10a is operable in the calibration mode. In the calibration mode, the switch circuit 32 conducts the signal source module 42 to the mixer 30, and separates the mixer 30 from the frequency translating filter backend circuit 34. In the calibration mode, the signal source circuit 40 provides a signal Sc0 as the auxiliary signal, e.g., a digital test signal or test tone in a low-frequency domain. The converter 38 coupled between the signal source circuit 40 and the filter 36 is a digital-to-analog converter (DAC) that converts the low-frequency digital signal Sc0 to a low-frequency analog signal Sc1. The filter 36 coupled between the switch circuit 32 and the converter 38 may be an analog filter that provides a passband in a low-frequency domain to filter the signal Sc1 to a low-frequency signal Sc2. The filter 36 may serve as a conversion filter for suppressing conversion noises of the converter 38, e.g., quantization errors. The signal Sc2 is transmitted via the switch circuit 32 to the mixer 30, which then mixes the signal Sc2 with the frequency fLOrx to up-convert the signal Sc2 in the low-frequency domain to a high-frequency domain to become the signal S0 of the input port 12. In other words, in the calibration mode, the signal S0 of the input port 12 is an internal signal from within the chip, and may be regarded as a reference signal for calibration. The signal S0 is similarly amplified, down-converted, filtered and converted by the amplifier 14, the mixer 16, the filter 18 and the converter 20 to form a signal S4. Thus, the signal S4 that the receiver path 46 generates in response to the signal Sc0 may reflect the performance of the receiver path 46. According to properties of the signal S4, the calibration circuit 24 may calibrate various operation parameters of the receiver path 46. The calibration circuit 24 may include a filter 26 and a control circuit 28. The filter 26 serves as a calibration auxiliary filter, and may be a digital filter that filters the signal S4 to a signal S5. The control circuit 28 measures properties of the signal S5, e.g., a size of the amplitude, to accordingly calibrate the receiver path 46.

In FIG. 1, not only the communication circuit 10a of the present invention is capable of providing a frequency translating loop filter in the reception mode to replace an external SAW filter, but is also capable of up-converting the test signal in a low-frequency domain to a high-frequency domain by the existing frequency translating loop filter to further calibrate the operation parameters of the receiver path 46.

Figure 2:
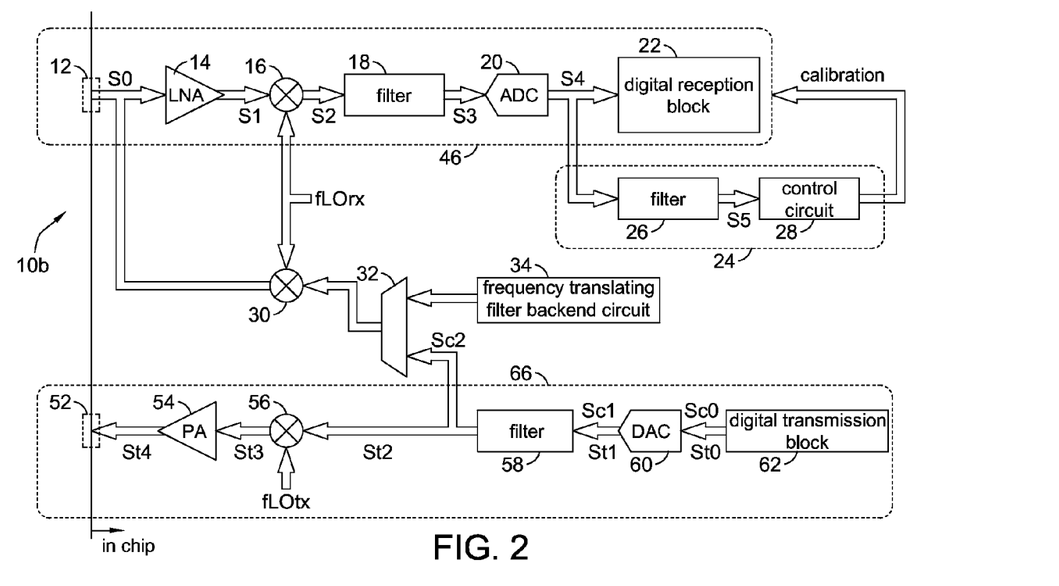

FIG. 2 shows a communication circuit 10b according to an embodiment of the present invention. The communication circuit 10b, which may serve as a transceiver, includes a receiver path 46, a calibration circuit 24, a mixer 30, a switch circuit 32, a frequency translating filter backend circuit 34, and a transmitter path 66. The transmitter path 66 includes an output port 52, an amplifier 54, a mixer 56, a filter 58, a converter 60, and a digital transmission block 62. The amplifier 54 may be a power amplifier coupled between the output port 52 and the mixer 56. The mixer 56 may serve as an up-conversion transmission mixer coupled between the amplifier 54 and the filter 58. The filter 58 may be an analog filter that provides a passband in a low-frequency domain. The converter 60 is a DAC coupled between the digital transmission block 62 and the filter 58.

With the transmission path 66, in a transmission mode, information to be transmitted is encoded to a digital signal St0 by the digital transmission block 62, and the signal St0 is converted to an analog signal St1 by the converter 60. The filter 58 filters the signal St1 to form a signal St2. The mixer 56 mixes the signal St2 with a frequency fLOtx (i.e., a transmission oscillation frequency) to form a signal St3 in a high-frequency domain. The signal St3 is amplified by the amplifier 54 to a signal St4 and transmitted to a network medium (not shown).

The communication circuit 10b in FIG. 2 is operable in a reception mode and a calibration mode. Further, the communication circuit 10b is simultaneously operable in the reception mode and the transmission mode to receive an external signal by the receiver path 46 and to at the same time transmit information to a remote end by the transmitter path 66. For example, in certain networks that adopt frequency multiplexing, a communication circuit is required to simultaneously transmit signals and receive signals from a remote end. Alternatively, the communication circuit 10b may operate in the transmission mode and the reception mode in different periods. For example, the communication circuit 10b only transmits signals by the transmitter path 66 but does not receive signals in a certain period, and only receives external signals by the receiver path 46 but does not transmit signals in another period. For example, in certain networks that adopt time-domain multiplexing, a communication circuit is required to perform only either signal reception or signal transmission in one timeslot. The operation frequency fLOrx of the receiver path 46 and the operation frequency fLOtx of the transmitter path 66 may be the same or different.

In the communication circuit 10b, the switch circuit 32 is coupled between the mixer 30, the filter 58 and the frequency translating filter backend circuit 34. When operating in the reception mode, the switch circuit 32 conducts between frequency translating filter backend circuit 34 and the mixer 30, and separates the mixer 30 from the filter 58. As such, the mixer 30 and the frequency translating filter backend circuit 34 are able to collaboratively perform frequency translating loop filtering on the receiver path 46.

When the communication circuit 10b need not receive an external signal or transmit a signal to a remote end, the communication circuit 10b may enter a calibration mode. In the calibration mode, the digital transmission block 62 provides a signal Sc0 as a test signal/tone for auxiliary calibration, and the converter 60 converts the signal Sc0 to a signal Sc1, which is then filtered into a signal Sc2 by the filter 58. In the calibration mode, the switch circuit 32 separates the frequency translating filter backend circuit 34 from the mixer 30, and conducts between the mixer 30 and the filter 58, such that the signal Sc2 is conducted via the switch circuit 32 to the mixer 30. The mixer 30 mixes and up-converts the signal Sc2 in a low-frequency domain with the frequency fLOrx to form a reference signal S0 in a high-frequency domain for calibration. The reference signal S0 is received by the receiver path 46. As such, the calibration circuit 24 may calibrate the receiver path 46 according to the response (e.g., the signal S4) of the receiver path 46 to the signal S0.

In other words, when the communication circuit 10b operates in the calibration mode, the signal source circuit 40, the converter 38 and the filter 36 in the signal source module 42 in FIG. 1 may be respectively realized by sharing the existing digital transmission block 62, converter 60 and filter 58 in the transmitter path 66. Accordingly, the present invention is capable of achieving a built-in receiver path calibration mechanism by a simple and low-overhead hardware architecture.

Figure 3:
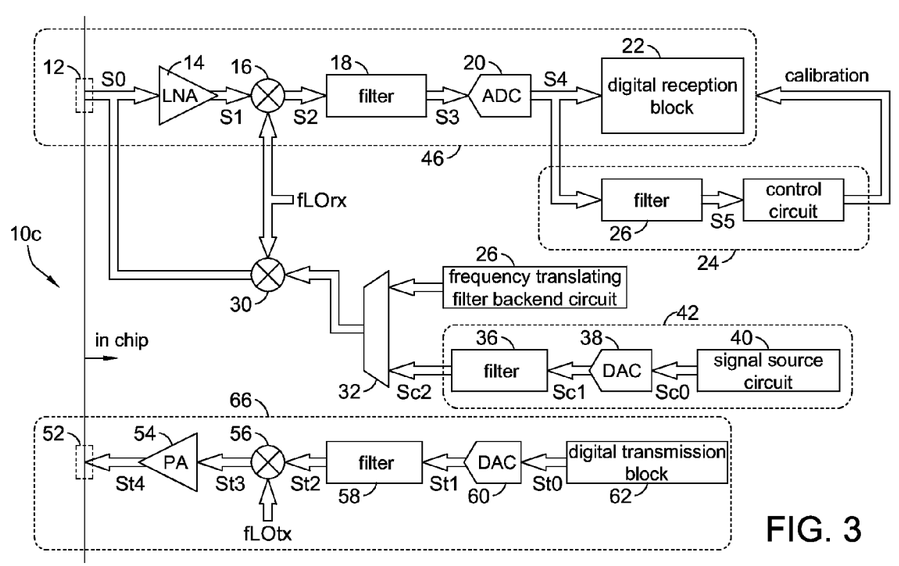

Further, the signal source module 42 and the transmitter path 66 may be mutually independent, as shown in a communication circuit 10c in FIG. 3. In the embodiment in FIG. 3, the communication circuit 10c includes a receiver path 46, a calibration circuit 24, a mixer 30, a frequency translating filter backend circuit 26, a signal source module 42 and a transmitter path 66. In a transmission mode, a digital transmission block 62 in the transmitter path 66 forms a signal St0 according to information to be sent, and a signal St4 is formed by operations of a converter 60, a filter 58, a mixer 56 and an amplifier 54 and transmitted. In a calibration mode, a signal source circuit 40 provides a signal Sc0 as a test signal/tone, and a signal Sc2 is formed by operations of a converter 38 and a filter 36. The signal Sc2 is up-converted to an internal reference signal S0 for calibration. According to the response of the receiver path 46 to the signal S0, the calibration circuit 24 may calibrate operation parameters of the receiver path 46. In other words, the converter 38 and the filter 36 may be dedicated for calibration.

The signal source module 42 and the transmitter path 66 may also share a part of the circuits. For example, the signal source module 42 may exclude the signal source circuit 40. In the transmission mode, the digital transmission block 62 provides the converter 60 with the signal St0; in the calibration mode, the digital transmission block 62 provides the converter 38 of the signal source module 42 with the signal Sc0 that serves as the test signal/tone. In other words, the digital transmission block 62 may realize the signal source circuit 40 in the calibration mode, with the converters 38 and 60 however mutually independent from the filters 58 and 36.

Similarly, the signal source module 42 may be disposed with the filter 36, and share the digital transmission block 62 and the converter 60 in the transmitter path 66 to realize the signal source circuit 40 and the converter 38. In the calibration mode, the digital transmission block 62 provides the converter 60 with the signal Sc0 that serves as the test signal/tone, and the converter 60 converts the signal Sc0 to the signal Sc1. The signal Sc1 is fed to the filter 36 in the signal source module 42 to form the signal Sc2, which is up-converted by the mixer 30 and sent back to the input port 12 of the receiver path 46 to accordingly calibrate the receiver path 46.

In the embodiments in FIG. 1 to FIG. 3, the switch circuit 32 may also be eliminated, and the signal source module 42 (or, in FIG. 2, the digital transmission block 62, the converter 50 and the filter 58 for realizing the signal source module 42) is directly coupled to the mixer 30. In the calibration mode, the signal Sc2 provided by the signal source module 42 is up-converted by the mixer 30, and then sent back to and received by the receiver path 46. In the reception mode, the filter 36 (or the filter 58 in FIG. 2) in the signal source module 42 may serve as a load of the mixer 30, and together with the mixer 30 provide a passband in a low-frequency domain. The low-frequency passband is up-converted to a passband in a high-frequency domain by the mixer 30, thereby similarly achieving a function of a frequency translating loop filter for the input port 12.

In the embodiments in FIG. 2 and FIG. 3, the transmitter path 66 is integrated in the communication circuit. When a loop-back path that can be selectively conducted in the chip is established between the output port 52 and the input port 12, the loop-back path can be conducted in the calibration mode, in a way that the signal of the output port 52 may also serve as the internal reference signal for calibration that is received by the receiver path 46. When returning to the transmission mode and/or the reception mode, the loop-back path is disconnected to prevent mutual interferences between the receiver path 46 and the transmitter path 66. However, as the signals of the output port 52 and the input port 12 are signals in a high-frequency domain, even when the loop-back path is disconnected, the high-frequency signals nevertheless couple from one end of the loop-back path to the other end as high-frequency electromagnetic interferences caused by the high-frequency signals are extremely difficult to shield and suppress. In other words, an attempt of implementing a calibration mechanism by directly utilizing a loop-back architecture between the output port 52 and the input port 12 may severely affect normal operations of the receiver path 46 and the transmitter path 66. In comparison, the present invention does not necessarily require the loop-back path between the output port 52 and the input port 12, and therefore normal operations of the receiver path 46 and the transmitter path 66 can be maintained in addition to achieving the calibration mechanism.

For example, when the communication circuit 10b (in FIG. 2) operates in the calibration mode, the signal Sc2 conducted via the switch circuit 32 to the mixer 30 is equivalent to being loop fed back to the receiver path 46 via the transmitter path 66. Since the signal transmitted by the switch circuit 32 is a signal in a low-frequency domain and the electromagnetic interferences caused by low-frequency signals can be effectively controlled and suppressed, a coupling path that causes mutual interferences between the transmitter path 66 and the receiver path 46 is not formed. Preferably, the mixer 30 that up-converts the signal Sc2 may be rendered to operate at the frequency fLOrx as the receiver path 46, such that the receiver path 46 may also be provided with frequency translating loop filtering without affecting normal operations of the receiver path 46.

Figure 4:
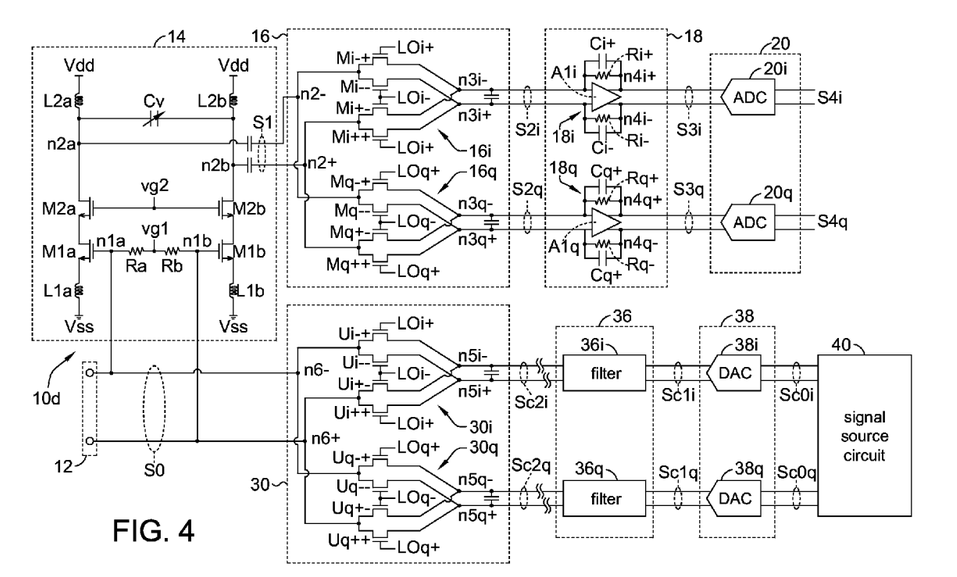

FIG. 4 shows a schematic diagram of a communication circuit 10d according to an embodiment of the present invention. The communication circuit 10d may be utilized to realize the architecture of the communication circuit 10a in FIG. 1. Similar to the communication circuit 10a in FIG. 1, the communication circuit 10d in FIG. 4 also includes an input port 12, an amplifier 14, a mixer 16, a filter 18 and a converter 20 of a receiver path, and further includes a mixer 30 serving as an auxiliary mixer, as well as a filter 36, a converter 38 and a signal source 40 utilized for a signal source module 42 (in FIG. 1).

As shown in FIG. 4, the amplifier 14 may be a dual-input, dual-output differential LNA coupled to the input port 12 at nodes n1a and n1b, and provides a signal S1 by nodes n2+ and n2− according to a signal S0 of the input port 12. The amplifier 14 operates between supply voltages Vdd and Vss (e.g., a ground voltage), and may include transistors M1a, M1b, M2a and M2b (e.g., n-channel MOS transistors), resistors Ra and Rb, inductors L1a, L1b, L2a and L2b, and a capacitor Cv. The transistor M1$ (where $ is "a" or "b") has its gate, source and drain respectively coupled to the node n1$, one end of the inductor L1$ and the source of the transistor M2$. The inductor L1$ may be regarded as a source degenerate inductor, and has one end coupled to the supply voltage Vss. The resistor R$ is coupled between a bias voltage vg1 (e.g., a DC bias) and the node n1$. The transistor M2$ has its gate and drain respectively coupled to a bias voltage vg2 and the node n2$. The inductor L2$ is coupled between the supply voltage Vdd and the node n2$. The inductors L2a and L2b and the capacitor Cv may be regarded as a load of the amplifier 14, with the load having a resonance frequency that affects the frequency response of the LNA. Thus, the capacitor Cv may be a varactor having a controllable and adjustable capacitance value for adjusting the frequency resonance of the amplifier 14.

The mixer 16 may be a collective name for mixers 16i and 16q. The mixer 16x includes four transistors Mx@# (where x may be "i" or "q", @ may be "+" or "−", and # may be "+" or "−") that serve as switches to form a double-balanced mixer. The transistor Mx@# has its gate coupled to the signal LOx#. The transistors Mx−+ and Mx−− have one of their sources and drains coupled to the node n2− and the other respectively coupled to the nodes n3x− and 3nx+. The transistors Mx+− and Mx++ have one of their sources and drains coupled to the node n2+ and the other respectively coupled to nodes n3x− and n3x+. As such, the mixer 16x may mix the signal S1 between the nodes n2+ and n2− with the signal LOx+/LOx− to accordingly provide a down-converted signal S2x between the nodes n3x+ and n3x−. Frequencies of the signals LOi+, LOi−, LOq+ and LOq− are all equal to the frequency fLOrx (in FIG. 1), a phase difference between the signals LOi+ and LOi− is 180 degrees, a phase difference between the signals LOq+ and LOq− is 180 degrees, and a phase difference between the signals LOi+ and LOq+ is 90 degrees.

Signals S2i and S2q form the signal S2 in FIG. 2, and are transmitted to the filter 18 by the mixer 16. The filter 18 may be a collective name of filters 18i and 18q. For example, the filter 18x (where x is equal to "i" or "q") may be a dual-input, dual-output differential low-pass filter for filtering the signal S2x between the nodes nx3+ and nx3− to accordingly generate a signal S3x between nodes n4x+ and n4x−. The filter 18x (where x is equal to "i" or "q") includes an amplifier A1x (e.g., an operational amplifier), two capacitors Cx+ and Cx−, and two resistors Rx+ and Rx−. The capacitor Cx+ and the resistor Rx+ are connected in parallel between the nodes n3x− and n4x+, and the capacitor Cx− and the resistor Rx− are connected in parallel between the nodes n3x+ and n4x−.

Signals S3i and S3q form the signal S3 in FIG. 1, and are transmitted to the converter 20 by the filter 18. The converter 20 may be a collective name for two converters 20i and 20q. The converter 20x (where x is equal to "i" or "q") is an ADC that converts the analog signal S3x to a digital signal S4x. Signals S4i and S4q may form the signal S4 in FIG. 1. In other words, the receiver path of the communication circuit 10d in FIG. 4 may be divided into an in-phase path and a quadrature-phase path. The in-phase path is formed by the mixer 16i, the filter 18i and the converter 20i. The quadrature-phase path is formed by the mixer 16q, the filter 18q and the converter 20q.

In an auxiliary mode, the signal source circuit 40 in the communication circuit 10d in FIG. 4 provides two differential signals Sc0i and Sc0q to form the signal Sc0 in FIG. 1. The converter 38 may be a collective name for two DACs 38i and 38q that respectively convert the digital signals Sc0i and Sc0q to analog signals Sc1i and Sc1q. The filter 36 may be a collective name for two filters 36i and 36q that respectively filter the signals Sc1i and Sc1q into signals Sc2i and Sc2q. The mixer 30 may be a collective name for two mixers 30i and 30q. The mixer 30x includes four transistors Ux@# (where x may be "i" or "q", @ may be "+" or "−", and # may be "+" or "−") that serve as switches. Each transistor Ux@# has its gate coupled to a signal LOx#. The transistors Ux−+ and Ux−− have one of their sources and drains coupled to a node n6− and the other respectively coupled to nodes n5x− and n5x+. The transistors Ux+− and Ux++ have one of their sources and drains coupled to a node n6+ and the other respectively coupled to the nodes n5x− and n5x+. The nodes n6+ and n6− are respectively coupled to the nodes n1a and n1b of the input port 12. As such, the mixer 30i may mix the signal Sc2i with the signal LOi+/LOi−, and the mixer 30q may mix the signal Sc2i with the signal LOq+/LOq− to accordingly provide an up-converted built-in loop feedback signal S0 between the nodes n6+ and n6−. As the mixer 30 is provided with an in-phase up-conversion path and a quadrature-phase up-conversion path, in the auxiliary mode, a single-sideband or double-sideband signal may be selectively combined for the input port 12; in the reception mode, the single-sideband or double-sideband of the filter 36 may be selected to be up-converted to a passband for high-frequency filtering.

Figure 5:
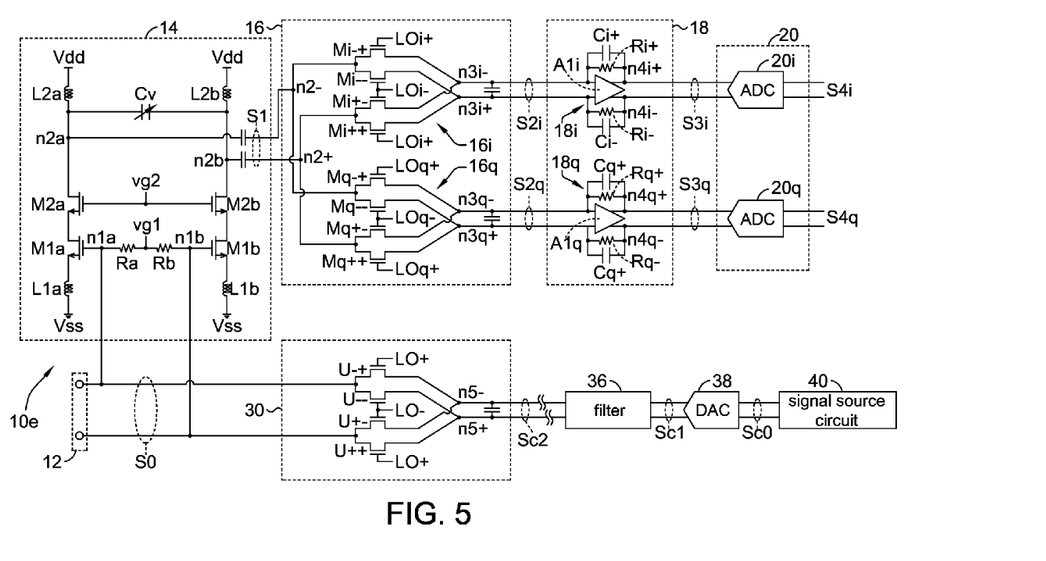

FIG. 5 shows a schematic diagram of a communication circuit 10e according to an embodiment of the present invention. The communication circuit 10e may be utilized to realize the architecture of the communication circuit 10a in FIG. 1. Similar to the communication circuit 10a in FIG. 1, the communication circuit 10e in FIG. 5 also includes an input port 12, an amplifier 14, a mixer 16, a filter 18 and a converter 20 of a receiver path, and further includes a mixer 30 serving as an auxiliary mixer, as well as a filter 36, a converter 38 and a signal source 40 in a signal source module. The mixer 30 includes four transistors U−+, U−−, U+− and U−− serving as switches. The transistors U−+ and U++ have their gates coupled to a signal LO+. The transistors U+− and U−− have their gates coupled to a signal LO−. The transistors U−+ and U−− have one of their sources and drains coupled to a node n1a and the other respectively coupled to nodes n5− and n5+. The transistors U+− and U++ have one of their sources and drains coupled to a node n1b and the other respectively coupled to the nodes n5− and n5+. As such, the mixer 30 may mix a signal Sc2 with the signal L0+/L0− to accordingly provide the input port 12 with an up-converted built-in loop feedback signal S0. Frequencies of the signals LO+ and LO− may be equal to those of the signals LOi+ and LOi−, LOq+ and LOq−. In an auxiliary mode, the mixer 30 of the communication circuit 30 may provide a double-sideband signal to the input port 12. In a reception mode, the mixer 30 may up-convert a double-sideband of the filter 36 to a high-frequency passband to provide the input port 12 with frequency translating filtering.

As in the discussion associated with FIG. 1 to FIG. 3, the signal source circuit 40, the converter 38 and/or the filter 36 in FIG. 4 and FIG. 5 are shared with a transmitter path (as in FIG. 2) or may be independent from the transmitter path (as shown in FIG. 3).

Figure 6:
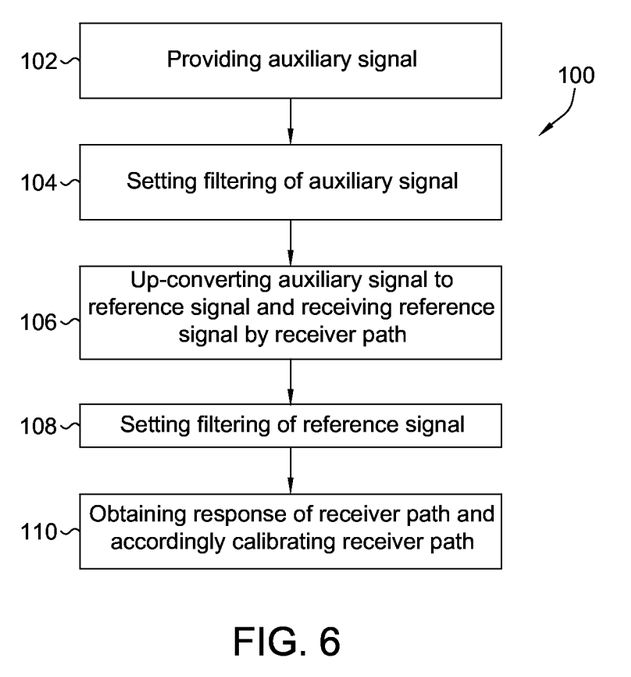
FIG. 6 is a flowchart according to an embodiment of the present invention.

FIG. 6 shows a flowchart of a process 100 according to an embodiment of the present invention. The process 100 is applicable to the communication circuit of the present invention, e.g., the communication circuits 10a to 10e in FIG. 1 to FIG. 5, to adjust an operation parameter of the receiver path 46 in an auxiliary mode for calibration. The process 10 may be performed when the receiver path need not receive external signals. For example, the process 100 may be performed when the receiver path 46 is powered up. Further/Alternatively, the process 100 may be performed during an idle period between a burst period and a pre-burst period of the receiver path 46. The process 100 according to an embodiment includes the following steps.

In step 102, a calibration mode is entered to provide an auxiliary signal Sc0 by the signal source circuit 40 (in FIG. 1/FIG. 3) or the digital transmission block 62 (in FIG. 2), and the auxiliary signal Sc0 is converted to an auxiliary signal Sc1 by the converter 38 or 60. The auxiliary signal Sc0/Sc1 may be a test tone or a test signal in a low-frequency domain. The test tone may be a signal having a single predetermined frequency in the frequency domain; the test signal may be a signal that extends through a section of bandwidth in the frequency domain, and/or a signal having a specific waveform or pattern.

In step 104, filtering for the auxiliary signal Sc1 is set. For example, a passband of the filter 38 (in the embodiment in FIG. 1/FIG. 3) or the filter 58 (in FIG. 2) is set, such that the passband (e.g., a low-pass passband of a 3 dB bandwidth) is capable of suppressing noises other than the auxiliary signal Sc1, e.g., conversion noises of the converter 38 or 60 and/or other types of noises.

In step 106, the auxiliary signal Sc1 in the low-frequency domain is mixed with a frequency fLOrx by the mixer 30 and up-converted to accordingly provide a signal S0 in a high-frequency domain to the input port 12. The signal S0 in the high-frequency domain serves a reference signal for calibration. In response to the input of the signal S0, the receiver path 46 performs down-conversion by the mixer 16 to output a response signal S2. In step 102, properties (e.g., a frequency/frequency band and/or an amplitude/waveform) of the signal Sc0/Sc1 is set according to properties of the operation parameter under calibration, such that the signal S0 in step 106 reflects the influence that the operation parameter under calibration poses on the receiver path. For example, by controlling the setting of the signal Sc0/Sc1, a normal external signal or external signal carrier in a high-frequency domain may be simulated in the signal S0 to observe whether the setting of the operation parameter under calibration renders a signal reception performance that satisfies an expected standard, or/and whether the signal reception performance is optimized. Alternatively, an interference signal in a high-frequency domain may also be simulated in the signal S0 to observe whether the setting of the operation parameter provides the receiver path with an interference suppressing capability that satisfies an expected standard.

In step 108, filtering on the signal S2 is set, and may include setting a passband (e.g., a low-pass passband of a 3 dB bandwidth) of the filter 18, and/or setting a passband (e.g., a high-pass passband) of the filter 26. The signal S2 is filtered by the filter 18 and the filter 26 to form a signal S5, through which the control circuit 28 learns the performance of the receiver path 46 to further adjust the operation parameter of the receiver path 46. By setting the filter 18 and/or the filter 26, a part in the signal S5 associated with the operation parameter under calibration can be preserved while filtering out an unassociated part. That is, step 108 renders an intersection of the passbands of the filters 18 and 26 to cover a response frequency range to be monitor and eliminates other frequency ranges that need not be monitored.

In step 110, the control circuit 28 obtains the signal S5 and accordingly adjusts the operation parameter under calibration to a correct values and/or an optimized value. For example, the control circuit 28 in the calibration circuit 24 may change the operation parameter to different values, in a way that the receiver path 46 responds to the input signal S0 of the input port based on the different values of the operation parameter and correspondingly generates a plurality of response signals S5. The control circuit 28 may compare sizes of these signals S5, e.g., a peak-to-peak amplitude, to identify an optimized value for the operation parameter under calibration. The calibration circuit 24 (in FIG. 1) may include a volatile memory (e.g., a buffer) and/or a non-volatile memory (not shown) for temporarily storing and/or recording the optimized value.

Figure 7:
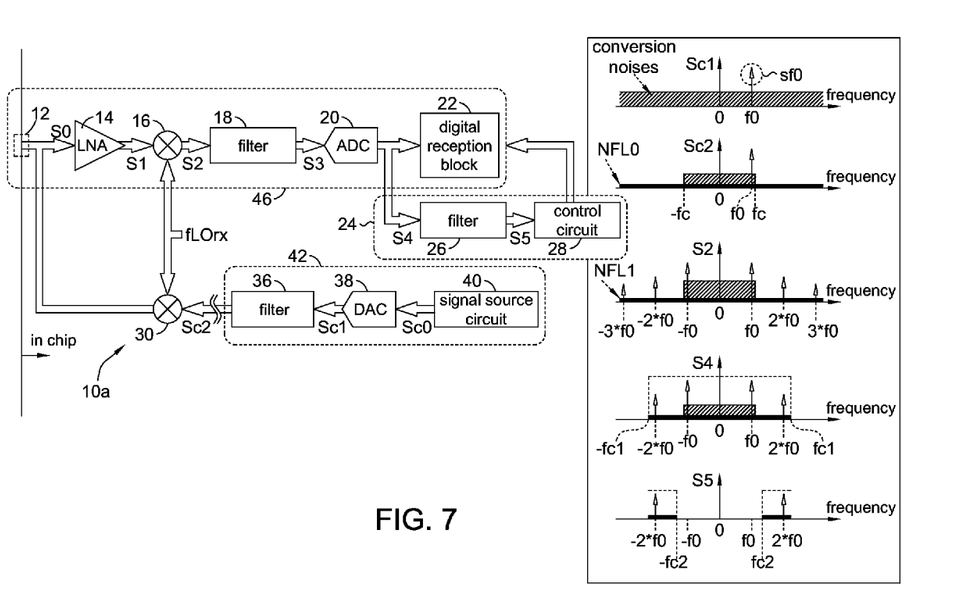
FIG. 7 to FIG. 9 are schematic diagram of calibrating various operation parameters according an embodiment of the present invention.

FIG. 7 shows a schematic diagram of an example of calibrating a receiver path by the communication circuit 10a in FIG. 1 according to an embodiment. For example, in the embodiment in FIG. 7, the operation calibration under calibration may be a bias voltage of the mixer 16. The setting of the bias voltage, e.g., a second-order inter-modulation intercept point (IIP2) associated with second-order harmonics, affects a level of non-linearity of the receiver path 46. Thus, the bias voltage of the mixer 16 is calibrated to suppress the second-order harmonics as much as possible and to thus increase the IIP2.

To calibrate the bias voltage of the mixer 16, the communication circuit 10a operates in the auxiliary mode for calibration when the process 100 begins. In the calibration mode, the signal source circuit 40 performs step 102 to provide a signal Sc0. The signal Sc0 may be a test tone in a frequency f0 to simulate a signal in a low-frequency domain that the receiver path 46 processes when the receiver path 46 normally receives signals. The signal Sc0 is converted to a signal Sc1 by the converter 38. Thus, in addition to a signal sf0 having the frequency f0, the signal Sc1 further includes a conversion noise of the converter 38. In the frequency domain, a spectrum of a conversion noise is similar to a spectrum of a white noise, as shown in FIG. 7. To preserve the signal sf0 while filtering out the conversion noise from the signal Sc1 as much as possible, step 104 is performed to set an upper frequency limit fc of the passband of the filter 36 to approach the frequency f0. After the filter 36 filters the signal Sc1 into a signal Sc2, the conversion noise in the signal Sc2 is limited within a range of the frequency fc, and components of the frequency f0 are maintained above a noise floor NFL0, as shown in the spectrum in FIG. 7.

The signal Sc2 in a low-frequency domain is up-converted by the mixer 30 to a signal S0, which is fed back to the receiver path 46 (step S106), amplified by the amplifier 14 to a signal S1, and down-converted by the mixer 16 in the receiver path 46 to a signal S2. Due to the non-linearity of the mixer 16, the signal S2 includes not only component frequencies of the fundamental frequency f0 but also components of harmonics, e.g., second harmonics (components in a frequency of 2*f0) and third harmonics (components in a frequency of 3*f0). Preferably, the object of calibration is to optimize the suppression that the receiver path 46 poses on the second harmonics, and thus the second harmonics are the response to be monitored in the calibration process.

To monitor the second harmonics in the signal S2, the signal Sc0 may be given a sufficient amplitude in step 102, such that the second harmonics in the signal S2 may be greater than the noise floor NFL1 of the noise amplified (by the amplifier 14), as shown in FIG. 7. Further, to emphasize the second harmonics in the signal S2, in step 108, the upper frequency limit fc1 of the passband of the filter 18 (e.g., a low-pass filter) may be set to fall between the second harmonics and the third harmonics (i.e., (2*f0)<fc1>(3*f0)), so as to filter out the third or higher harmonics from the signal S4. Further, in step 108, a low frequency limit fc2 of the filter 26 (e.g., a high-pass filter) may be designed to fall between f0 and 2*f0, so as to filter out a baseband having the frequency f0 from the signal S5. In other words, with the setting of step 108, an intersection of the low-pass passband of the filter 18 and the high-pass passband of the filter 26 covers on the second harmonics to accordingly filter out the baseband and other high-order harmonics. As such, when performing step 110, the control circuit 28 in the calibration circuit 24 may adjust the bias voltage of the mixer 16 according to the size (amplitude) of the signal S5. If the signal S5 still contains basebands and other high-order harmonics, the control circuit 28 is required to further perform a frequency detection on the signal S5 to select the second harmonics to be monitored. In contrast, if the filters 18 and 26 can be appropriately set to filter out basebands and other high-order harmonics that need not be monitored, the control circuit 28 is only required to perform a simple amplitude measurement on the signal S5.

When performing step 110, the control circuit 28 may first set a bias setting of the mixer 16 to a first value and measure the response signal S5, and then change the bias voltage of the mixer 16 to a second value and again measure the response signal S5. When the response corresponding to the first value is larger, it means that the receiver path 46 better suppresses the second harmonics with respect to the second value. Conversely, when the response corresponding to the second value is larger, it means that the receiver path 46 better suppresses the second harmonics with respect to the first value. Based on the above principle, the control circuit 28 may change the bias voltage of the mixer 16 to various different values and measure the signal S5 in response to the different values. Preferably, when the signal S5 is the smallest in response to a certain value, this value may be regarded as an optimized value among the different values.

As shown in FIG. 4 and FIG. 5, the mixer 16 may include the in-phase-path mixer 16i and the quadrature-phase-path mixer 16q. Thus, the bias voltage of the mixer 16 may include bias voltages (e.g., gate bias voltages of the transistors Mi++ to Mi--, and Mq++ to Mq--) of the mixers 16i and 16q, respectively represented by bias voltages VgI and VgQ (not shown). As the mismatch between the mixer 16i and 16q affects the suppressing capability of the receiver path 46 on the second harmonics, the bias voltages (VgI and VgQ) of the mixers 16i and 16q may be regarded as one that can be together adjusted in a same process. For example, when performing step 110, the bias voltage VgI is first fixed to a value VI[0], and the bias voltage VgQ is changed to two (or more) different values VQ[1a] and VQ[1b]. The signal S5 in response to the two settings of the bias voltages (VgI, VgQ)=(VI[0], VQ[1a]) and the bias voltages (VgI, VgQ)=(VI[0], VQ[1b]) is measured, and the preferred bias voltages (VgI, VgQ) are then selected. Assume that the preferred voltages (VgI, VgQ) are (VI[0], VQ[1a]). Based on a previously identified preferred value VQ[1a], the bias voltage VgQ may be fixed to the value VQ[1a], and the bias voltage VgI is changed to two different values VI[1a] and VI[1b]. The signal S5 in response to the two settings of the bias voltages (VgI, VgQ)=(VI[1a], VQ[1a]) and the bias voltages (VgI, VgQ)=(VI[1b], VQ[1a]) is measured, and the preferred bias voltages (VgI, VgQ) are then selected. Assume that the preferred voltages (VgI, VgQ) are (VI[1b], VQ[1a]).

Further, based on the previously identified preferred value VI[1b], the step of "fixing the bias voltage VgI and changing the bias voltage VgQ" is repeated. That is, the bias voltage VgI is fixed at the value VI[1b], and the bias voltage VgQ is changed to two different values VQ[2a] and VQ[2b], and the preferred voltages [VgI, VgQ] are then selected from the values (VI[1b], VQ[2a]) and (VI[1b], VQ[2b]). Assume the preferred bias voltages are (VI[1b], VQ[2b]). Based on the previously identified preferred value VQ[2b] for the bias voltage VgQ, the previous step of fixing the bias voltage VgQ and changing the bias voltage VgI is repeated. That is, the bias voltage VgQ is fixed at the value VQ[2b], and the bias voltage VgI is changed to two different values VI[2a] and VQ[2b] to select the preferred bias voltages (VgI, VgQ). Assume the preferred values for the bias voltages are (VI[2a],VQ[2b]). Similarly, the steps of "fixing the bias voltage VgI and changing the bias voltage VgQ" and "fixing the bias voltage VgQ and changing the bias voltage VgI" are sequentially repeated to converge the bias voltages (VgI, VgQ) to optimized values. For example, assuming that an adjustable range of the bias voltage VgQ is [Vgmin, Vgmax], the value VQ[1a] may be selected from a range [Vgmin, (Vgmin+Vgmax)/2], and the value VQ[1b] may be selected from a range [(Vgmin+Vgmax)/2, Vgmax]. Next, the value VQ[2a] may be selected from a range [Vgmin, (Vgmax+3*Vgmin)/4], and the value VQ[2a] may be selected from a range [(Vgmax+3*Vgmin)/4, (Vgmax+Vgmin)/2], and so forth. With the above bisection searching method, optimized values of the bias voltages (VgI, VgQ) can be identified.

Figure 8:
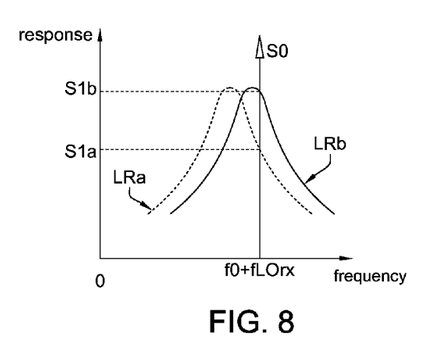

In addition for calibrating the bias voltage of the mixer 16, the process 100 may also be applied to calibrate other operation parameters of the receiver path 46, e.g., a frequency response of the amplifier 14. FIG. 8 shows a schematic diagram of adjusting a frequency response of the amplifier according to an embodiment of the present invention. As shown in FIG. 4 and FIG. 5, the amplifier 14 may include a load formed by the inductors L2a and L2b and the capacitor Cv. The resonance frequency of the load affects the frequency response of the amplifier 14. Therefore, the process 100 may be utilized to calibrate the load, e.g., adjusting a capacitance value of the capacitor Cv. As shown in FIG. 8, after the process 100 begins, the signal source circuit 40 (in FIG. 1) provides a low-frequency signal Sc0 having a frequency f0 as a test signal, which forms a high-frequency signal S0 having a frequency (f0+fLOrx) at the input port 12. The signal S0 is amplified by the amplifier 14 to a signal S1, which is then down-converted by the mixer 16 to a signal S2. In step 108, the settings of the filters 18 and 26 render an intersection of passbands of the filters 18 and 26 to cover the frequency f0 and to preserve a part of the signal having the frequency f0 in the signal S5. In step 110, the load may be set to a plurality of different value, e.g., a first value and a second value. When the load is set to the first value, assuming the frequency response of the amplifier 14 is as shown by a curve LRa, the size of the signal S1 corresponds to a lower response S1a such that the signal S5 is correspondingly smaller. In contrast, when the load is set to the second value, assuming the frequency response of the amplifier 14 is as shown by a curve LRb, the size of the signal S1 corresponds to a greater response S1b such that the signal S5 is correspondingly increased. It is concluded that the second value is preferred over the first value, meaning that the load in the second value may provide a larger amplification gain for the signal S0. According to the above principle, an optimized value may be selected from different values of the load to optimize the frequency response of the amplifier 14.

Figure 9:
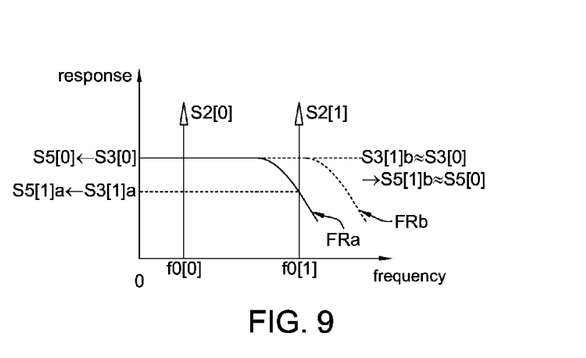

The process 100 may also be applied to calibrate the passband frequency of the filter 18. For example, the filter 18 may be a low-pass filter having a passband frequency as an upper frequency limit of a 3 dB bandwidth. FIG. 9 shows a schematic diagram of calibrating a bandpass frequency of the filter 18 by the process 100 according to an embodiment of the present invention. When performing the process 100, a signal Sc0 having a frequency f0[0] may be provided by the signal source circuit 40 (in FIG. 1), and is up-converted and down-converted by the mixers 30 and 16 to form a signal S2 represented as a signal S2[0]. The signal S2[0] is low-pass filtered by the filter 18 to be reflected as a response S3[0] in a signal S3. A signal S5 subsequently responded is then measured by the control circuit 28 to serve as a fundamental response S5[0]. Next, the signal source circuit 40 may provide a signal Sc0 having a frequency f0[1], which is a rated passband frequency of the filter 18, e.g., an upper frequency limited of the 3 dB bandwidth, where the frequency f0[0] is lower than the frequency f0[1]. The signal Sc0 having the frequency f0[1] is up-converted and down-converted by the mixers 30 and 16 to form the signal S2 that is represented as S2[1].

When performing step 110, the passband frequency of the filter 18 may be set to a plurality of different values, e.g., a first value and a second value. When the passband frequency is set to the first value, assuming that the frequency response of the filter 18 is as shown by a curve FRa, the signal S3 obtained from filtering a signal S2[1] displays a response S3[1]a, and a subsequent signal S5 is measured by the control circuit 28 as a response S5[1]a. Comparing the responses S5[1]a and S5[0], it can be learned whether the curve FRa satisfies the expected rated frequency response of the filter 18. When the curve FRa satisfies the expected rated frequency response, a ratio S3[1]a/S3[0] between the responses S3[1]a and S3[0] should be equal to −3 dB. Thus, the control circuit 28 may determine whether the ratio S3[1]a/S3[0] between the responses S3[1]a and S3[0] is equal to −3 dB. When the control circuit 28 learns that the ratio S3[1]a/S3[0] is smaller than −3 dB when comparing the responses S5[1]a and S5[0], it means the passband frequency of the filter 18 needs to be increased. In contrast, when the responses S5[1]a and S5[0] reflect that the ratio S3[1]a/S3[0] is greater than −3 dB, it means that the passband frequency of the filter 18 needs to be decreased. For example, when the passband frequency is set to the second value, assuming the frequency response of the filter 18 is as shown by a curve FRb, the response S3[1]b of the filtered signal S2[1] is also equal to the response S5[0]. Comparing S5[1]b and S5[0], the control circuit 28 may learn that the passband frequency is too large. According to the above principle, the control circuit 28 may adjust the passband frequency of the filter 18 so that operations of the filter 18 satisfy expectations.

Figure 10:
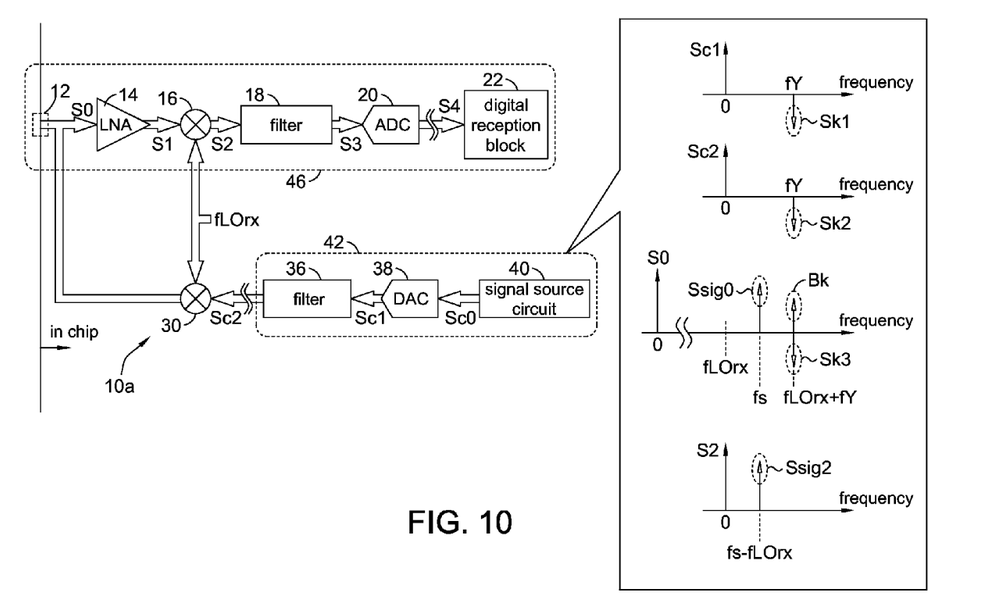
FIG. 10 is a schematic diagram of a suppressing/counteracting an undesired signal according an embodiment of the present invention.

In the present invention, not only can the mixer 30 (in FIG. 1) perform the auxiliary mode for calibration of the process 100, the mixer 30 may also be utilized to implement another auxiliary mode, e.g., a compensation mode. For example, when the receiver path 46 receives an external signal in the reception mode, in addition to normal signals desired for network communication, the signal S0 in a high-frequency domain of the input port 12 further includes undesired signals such as interference and/or spurs. Frequencies of these undesired signals may be very close to frequencies of the normal signals, and can be quite difficult to be filtered out. For example, a fundamental frequency, a 26 MHz of a crystal oscillator, is needed for operations of a chip. However, high-order harmonics of the fundamental clock also form undesired signals in the high-frequency domain. The present invention is targeted at suppressing/counteracting the undesired signals by a compensation signal in a high-frequency domain generated by the signal source module 42 and the mixer 30. FIG. 10 shows a schematic diagram of performing a compensation mode according to an embodiment of the present invention.

When the receiver path 46 operates in the reception mode, the signal source module 42 and the mixer 30 also at the same time operate in the compensation mode. In the compensation mode, the signal Sc1 of the signal source module 42 also includes a signal Sk1 having a frequency fY. The signal Sk1 is filtered by the filter 36 to form a signal Sk2 in the signal Sc2. The signal Sk2 having the frequency fY is up-converted by the mixer 30 to a signal Sk3 having a frequency (fLOrx+fY) to become a part of the signal S0. Further, as previously described, when the receiver path 46 receives an external signal, the signal S0 further includes a normal signal Sig0 (having a frequency fs) desired for communication and an undesired signal Bk. When the signal source module 42 provides the signal Sk1, a frequency and a phase of the signal Sk1 may be controlled such that a derived signal Sk3 may have the same frequency as but an opposite phase to the undesired signal Bk. Thus, the signal Sk3 may suppress/counteract the undesired signal Bk in the signal S0, such that the mixed signal S2 from the mixer 16 more distinctively presents a signal Ssig2 (having a frequency (fs−fLOrx) down-converted from a desired signal Ssig0 while the undesired signal is eliminated.

In conclusion, in the present invention, by providing a test signal using an internal signal source and an up-conversion filter that provides frequency translating filtering, a built-in calibration mechanism is formed to accordingly calibrate operation parameters of a receiver path and optimize operations of the receiver path. Instead of establishing a loop feedback path in a high-frequency domain between a receiver path and a transmitter path, the built-in calibration mechanism is based on a loop feedback in a low-frequency domain, and hence mutual interferences between the receiver path and the transmitter path can be prevented. Preferably, the built-in calibration mechanism is capable of dynamically performing calibration when the receiver path need not receive signals at all times, and is not limited to being performed during the factory test procedure. Preferably, the internal signal source and the up-conversion filter that performs frequency translating filtering may operate in collaboration to provide a compensation signal for suppressing/counteracting an undesired signal in normal communication.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A communication circuit, comprising:
    a receiver path, comprising:
        an input port; and
        a reception mixer, coupled to the input port, configured to mix a signal of the input port with a reception oscillation frequency; and
    a signal source circuit; and
    an auxiliary mixer, coupled between the input port and the signal source circuit, operable in an auxiliary mode;
    wherein, when the auxiliary mixer operates in the auxiliary mode, the signal source circuit provides an auxiliary signal, and the auxiliary mixer mixes the auxiliary signal with the reception oscillation frequency and sends a mixed result to the input port,
    wherein the auxiliary mixer is further operable in a reception mode; when the auxiliary mixer operates in the reception mode, the auxiliary mixer is configured to co-operate with a frequency translating filter backend circuit to filter the signal of the input port,
    the communication circuit further comprising:
    a switch circuit, coupled between the frequency translating filter backend circuit, the signal source circuit and the auxiliary mixer;
    wherein, when the auxiliary mixer operates in the auxiliary mode, the switch circuit conducts the signal source circuit to the auxiliary mixer; when the auxiliary mixer operates in the reception mode, the switch circuit conducts the frequency translating filter backend circuit to the auxiliary mixer.

2. The communication circuit according to claim 1, wherein when the auxiliary mixer operates in the reception mode, the auxiliary mixer mixes a first passband with the reception oscillation frequency to provide a second passband.

3. The communication circuit according to claim 1, further comprising:
    a transmitter path, comprising an output port and a transmission mixer;
    wherein, the auxiliary mixer is further operable in a transmission mode; when the auxiliary mixer operates in the transmission mode, the signal source circuit provides a signal to be transmitted to the transmission mixer, the transmission mixer mixes the signal to be transmitted with a transmission oscillation frequency and outputs a mixed result to the output port, and the auxiliary mixer stops mixing the signal provided by the signal source circuit.

4. The communication circuit according to claim 1, further comprising:
    a digital-to-analog converter (DAC), coupled to the signal source circuit; and
    a conversion filter, coupled between the DAC and the auxiliary mixer;
    wherein, when the auxiliary mixer operates in the auxiliary mode, the DAC is configured to convert and transmit the auxiliary signal to the conversion filter, and the conversion filter suppresses conversion noises of the DAC.

5. The communication circuit according to claim 1, further comprising:
    a calibration circuit, coupled to the receiver path;
    wherein, when the auxiliary mixer operates in the auxiliary mode, the calibration circuit adjusts an operation parameter of the receiver path according to a signal in the receiver path.

6. The communication circuit according to claim 5, wherein the auxiliary signal is associated with a fundamental frequency, the receiver path further comprises a reception filter coupled between the reception mixer and the calibration circuit, the calibration circuit further comprises a calibration auxiliary filter coupled to the reception filter; when the auxiliary mixer operates in the auxiliary mode, an intersection of passbands of the reception filter and the calibration auxiliary filter covers a harmonic of the fundamental frequency.

7. The communication circuit according to claim 6, wherein when the auxiliary mixer operates in the auxiliary mode, the calibration circuit adjusts the operation parameter of the receiver path according to a size of a signal that the calibration auxiliary filter obtains from filtering.

8. The communication circuit according to claim 7, wherein the operation parameter is a bias voltage of the reception mixer.

9. The communication circuit according to claim 5, wherein when the auxiliary mixer operates in the auxiliary mode, the calibration circuit changes the operation parameter to different values, and the receiver path provides a plurality of response signals in response to the signal of the input port according the different values of the operation parameter; when the calibration circuit adjusts the operation parameter, the calibration circuit compares sizes of the response signals to provide the operation parameter with an optimized value.

10. The communication circuit according to claim 9, wherein the receiver path further comprises a reception filter, and the operation parameter is a passband frequency of the reception filter.

11. The communication circuit according to claim 9, wherein the receiver path further comprises an amplifier, and the operation parameter is a load of the amplifier.

12. The communication circuit according to claim 1, wherein the auxiliary mixer operates in the auxiliary mode when the receiver path receives a signal to suppress interference in the signal of the input port.

13. A calibration method, applied to a communication circuit comprising a receiver path, a signal source circuit and an auxiliary mixer, the calibration method comprising:
   providing an auxiliary signal by the signal source circuit;
   mixing the auxiliary signal with a reception oscillation frequency by the auxiliary mixer to provide a reference signal;
   providing the reference signal to the receiver path, and adjusting an operation parameter of the receiver path according to a response of the receiver path with respect to the reference signal;
   associating the auxiliary signal to a fundamental frequency; and
   providing a passband covering a harmonic of the fundamental frequency;
   wherein, when adjusting the operation parameter of the receiver path, the operation parameter is adjusted according to a size of a filtering result of the passband.

14. The calibration method according to claim 13, the step of adjusting the operation parameter comprises:
   changing the operation parameter to different values;
   providing a plurality of response signals of the receiver path in response to the reference signal according to the different values of the operation parameter; and
   comparing sizes of the response signals to provide the operation parameter with an optimized value.

15. The calibration method according to claim 14, wherein the receiver path comprises a reception filter, and the operation parameter is a passband frequency of the reception filter.

16. The calibration method according to claim 14, wherein the receiver path further comprises an amplifier, and the operation parameter is a load of the amplifier.

17. The calibration method according to claim 14, wherein the receiver path further comprises a reception mixer, and the operation parameter is a bias voltage of the reception mixer.

18. A communication circuit, comprising:
   a receiver path, comprising:
      an input port; and
      a reception mixer, coupled to the input port, configured to mix a signal of the input port with a reception oscillation frequency; and
   a signal source circuit; and
   an auxiliary mixer, coupled between the input port and the signal source circuit, operable in an auxiliary mode;
   wherein, when the auxiliary mixer operates in the auxiliary mode, the signal source circuit provides an auxiliary signal, and the auxiliary mixer mixes the auxiliary signal with the reception oscillation frequency and sends a mixed result to the input port,
   the communication circuit further comprising:
   a calibration circuit, coupled to the receiver path;
   wherein, when the auxiliary mixer operates in the auxiliary mode, the calibration circuit adjusts an operation parameter of the receiver path according to a signal in the receiver path, and
   wherein the auxiliary signal is associated with a fundamental frequency, the receiver path further comprises a reception filter coupled between the reception mixer and the calibration circuit, the calibration circuit further comprises a calibration auxiliary filter coupled to the reception filter; when the auxiliary mixer operates in the auxiliary mode, an intersection of passbands of the reception filter and the calibration auxiliary filter covers a harmonic of the fundamental frequency.

* * * * *